United States Patent [19]

Takahashi et al.

[11] Patent Number: 5,227,822
[45] Date of Patent: Jul. 13, 1993

[54] CAMERA

[75] Inventors: Shinya Takahashi, Kodaira; Yasuo Asakura; Mitsuo Kawazoe, both of Hachioji, all of Japan

[73] Assignee: Olympus Optical Co., Ltd., Tokyo, Japan

[21] Appl. No.: 956,480

[22] Filed: Oct. 2, 1992

Related U.S. Application Data

[63] Continuation of Ser. No. 704,128, May 22, 1991, abandoned.

[30] Foreign Application Priority Data

Mar. 25, 1990 [JP] Japan .................................. 2-136228
Mar. 25, 1990 [JP] Japan .................................. 2-136229

[51] Int. Cl.⁵ ..................... G03B 17/02; G03B 15/03; G03B 1/00
[52] U.S. Cl. ................................. 354/82; 354/288; 354/149.11; 354/216
[58] Field of Search .................... 354/82, 288, 149.11, 354/289.1, 216

[56] References Cited

U.S. PATENT DOCUMENTS

| | | | |
|---|---|---|---|
| 3,451,322 | 6/1969 | Seijiro et al. | 354/288 |
| 4,420,240 | 12/1983 | Katsuma et al. | 354/288 |
| 4,597,654 | 7/1986 | Harvey et al. | 354/216 |
| 4,742,369 | 5/1988 | Ishii et al. | 354/289.1 X |
| 4,771,303 | 9/1988 | Matsumoto et al. | 354/288 X |
| 4,857,948 | 8/1989 | Akabane et al. | 354/288 |
| 4,860,039 | 8/1989 | Hata et al. | 354/288 X |
| 4,893,140 | 1/1990 | Yamamoto et al. | 354/149.11 |
| 5,036,343 | 7/1991 | Yamanaka | 354/82 |

Primary Examiner—Michael L. Gellner
Assistant Examiner—Jae N. Noh
Attorney, Agent, or Firm—Louis Weinstein

[57] ABSTRACT

A camera having a projecting portion disposed at the rear of an aperture portion for forming an image to be photographed on a film and a grip portion formed on the right side of a lens barrel, the left-hand portion of the projecting portion forming a substantially flat surface together with the outer surface of the lens barrel. The camera thus constituted can be significantly easily used because the grip portion can be easily held, the right arm is not easily separated from the body causing camera shake to be prevented at the time of the photographing operation, the fingers of the photographer do not touch the face and do not obstruct the operation when the photographer places his eye next to the viewfinder and observes the finder and the left-hand wrist does not come in contact with the edge of the camera when the left hand is placed on the outer surface of the lens barrel.

34 Claims, 8 Drawing Sheets

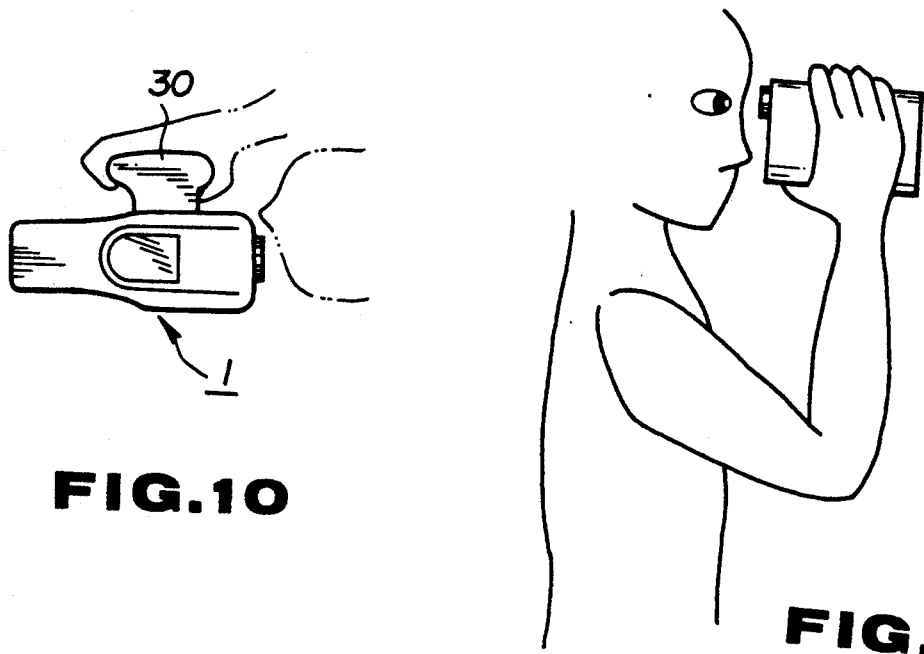
FIG.10
FIG.12
PRIOR ART
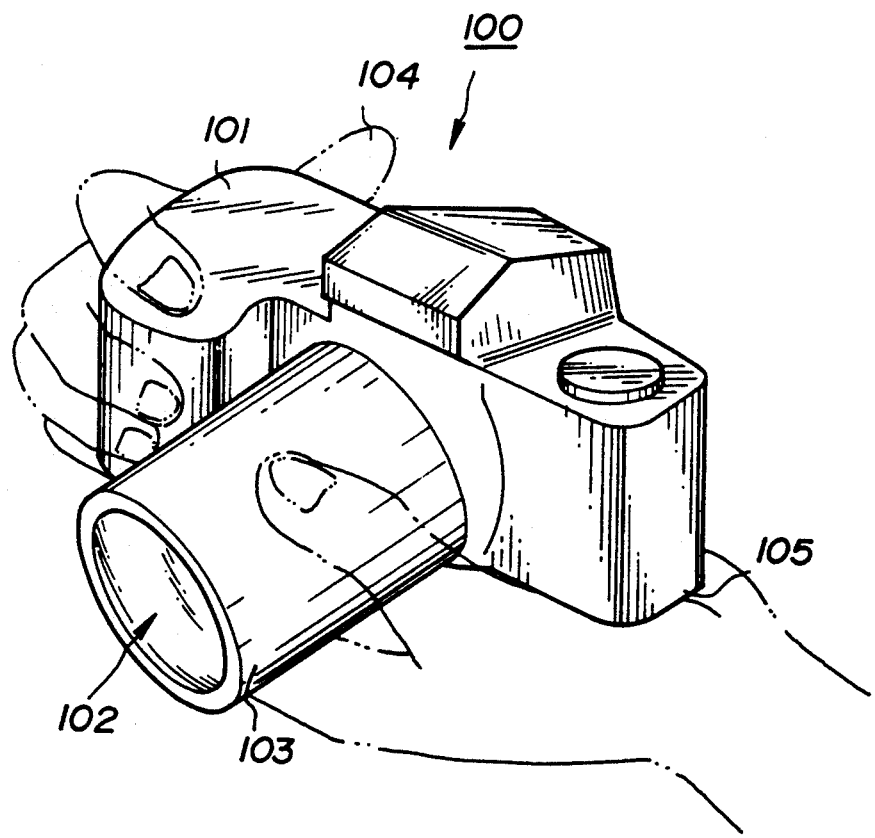
FIG.13
PRIOR ART ns, the fingers of the right hand of the photographer, specifically, the thumb 104 undesirably touches the face of the photographer when the photographer looks in the finder optical system. As a result, the photographer feels uncomfortable and the fingers will obstruct the photographer when he attempts to look in the finder optical system.

CAMERA

This is a continuation of application Ser. No. 07/704,128, filed May 22, 1991, now abandoned.

BACKGROUND OF THE INVENTION

1. FIELD OF THE INVENTION

The present invention relates to a camera, and, more particularly, to an improvement in the outer shape of a camera and that in the distribution of the internal structure of a camera which uses a film.

2. RELATED BACKGROUND ART

Hitherto, there has been a problem arisen in that a camera can be easily shaken in a case where a photographer takes a picture while holding the camera by the hands. Furthermore, a camera of a certain shape, which cannot be easily supported, will exhaust the photographer. In a case where a zoom optical system photographing lens is employed, the above-described problems become further critical because the lens barrel of the above-described system is too heavy.

In order to overcome the above-described problems, a camera, the shape of which is arranged in such a manner that the camera can be easily supported by the hand of a photographer, has been disclosed in Japanese Patent Laid-Open No. 1-207733.

A camera of the type disclosed in Japanese Patent Laid-Open No. 1-207733 comprises: a lens barrel forward projecting over the camera body; and a grip portion forward projecting over the camera body substantially parallel to the axis of the lens barrel at the side of the same and formed integrally and continuously from the lens barrel for the purpose of eliminating the moment generated due to the dead weight of the lens barrel. As a result, by holding the grip portion thus arranged by the hand of the photographer, the camera can be supported while keeping a good camera balance even if a lens barrel possessing a long focal distance or a lens barrel capable of zooming in/out the subject is used. Furthermore, an erroneous photographing operation due to the camera shaking can be prevented.

However, a camera of the type disclosed in Japanese Patent Laid-Open No. 1-207733 encounters a problem, as shown in FIG. 12, in that the arm of the photographer will be undesirably separated from the body when the photographer looks in the finder optical system, that is, the arm cannot be satisfactorily placed at the side of the photographer. If a photographing operation is carried out while holding the camera as described above, the camera cannot be stably supported. It will sometimes lead to a generation of camera shake.

Furthermore, a film magazine accommodating chamber is formed at another side of the lens barrel opposing the above-described grip portion. In a case where the film winding device is disposed in the above-described portion, the moment is generated around an axis which runs in parallel to the optical axis, that is, around a direction in which the grip portion extends. As a result, camera shake will be generated at the time of the photographing operation.

If another structure, which is, as shown in FIG. 13, arranged in such a manner that a grip portion 101 extending in a direction of the height of a camera 100 is formed so as to prevent the separation of the arm of the photographer from the body when the grip portion 101 is held by the right hand of the photographer, is employed in order to prevent the above-described prob-
Furthermore, the camera 100, the shape of which is arranged as described above, encounters a problem in that the left-hand wrist touches a lower end portion 105 of the camera 100 opposing the grip portion 101 in a case where the left hand of the photographer is placed along an outer wall 103 of a lens barrel 102. As a result, the camera 100 will be undesirably moved, causing a problem to be generated in that the camera 100 cannot be stably supported by the photographer.

SUMMARY OF THE INVENTION

An object of the present invention is to overcome the above-described problems experienced with the above-described conventional camera. That is, in a case where a photographing operation is performed while holding the conventional camera by the hand of a photographer, a problem arises in that the camera cannot be satisfactorily stably held due to the unsatisfactory adaptability between the hand and the shape of the grip portion, its adjacent portions, the lens barrel portion and the camera body formed at the rear of the lens barrel portion and the weight balance between the above-described elements. For example, when a photographer observes the finder, the right hand fingers touch the face, obstructing the observing operation. Furthermore, the right arm separates from the body of the photographer, causing camera shake to be easily generated.

Accordingly, a camera according to the present invention can be satisfactorily stably held by the hand of a photographer and is capable of improving the unsatisfactory weight balance between the elements. Furthermore, the inner and outer mechanisms are disposed to adapt to the arranged shape and weight so that the above-described conventional problems are overcome.

That is, the camera according to the present invention comprises a lens barrel disposed in front of an aperture for photographing a subject and a projecting portion disposed at the rear of the same. Furthermore, a grip portion to be held by the hand of a photographer at the time of the photographing operation is formed in the front portion on either side surface of the projecting portion. In addition, another side portion of the projecting portion is arranged to form a substantially flat portion together with the side surface of the above-described lens barrel.

According to the camera thus-constituted according to the present invention, the arm of the photographer is not separated from the body of the same when the camera is held by the fingers of either hand. Furthermore, the fingers do not touch the face of the photographer when the photographer places one eye next to the camera and looks in the finder optical system. In addition, the camera can be satisfactorily stably held by the photographer in a case where the fingers of another hand are placed on the surface of the camera. Furthermore, camera shake due the dead weight of the camera can be satisfactorily prevented and the camera can be satisfactorily and easily operated.

Other and further objects, features and advantages of the invention will be appear more fully from the following description.

BRIEF DESCRIPTION OF THE DRAWINGS

FIG. 10 is a top view which illustrates the state where the camera shown in FIG. 1 is held;

FIG. 12 is a side view which illustrates a state where a conventional camera is held; and FIG. 13 is a perspective view which illustrates a state where another conventional camera is held.

DETAILED DESCRIPTION OF PREFERRED EMBODIMENTS

A preferred embodiment of the present invention will now be described with reference to the drawings.

Figure 1:
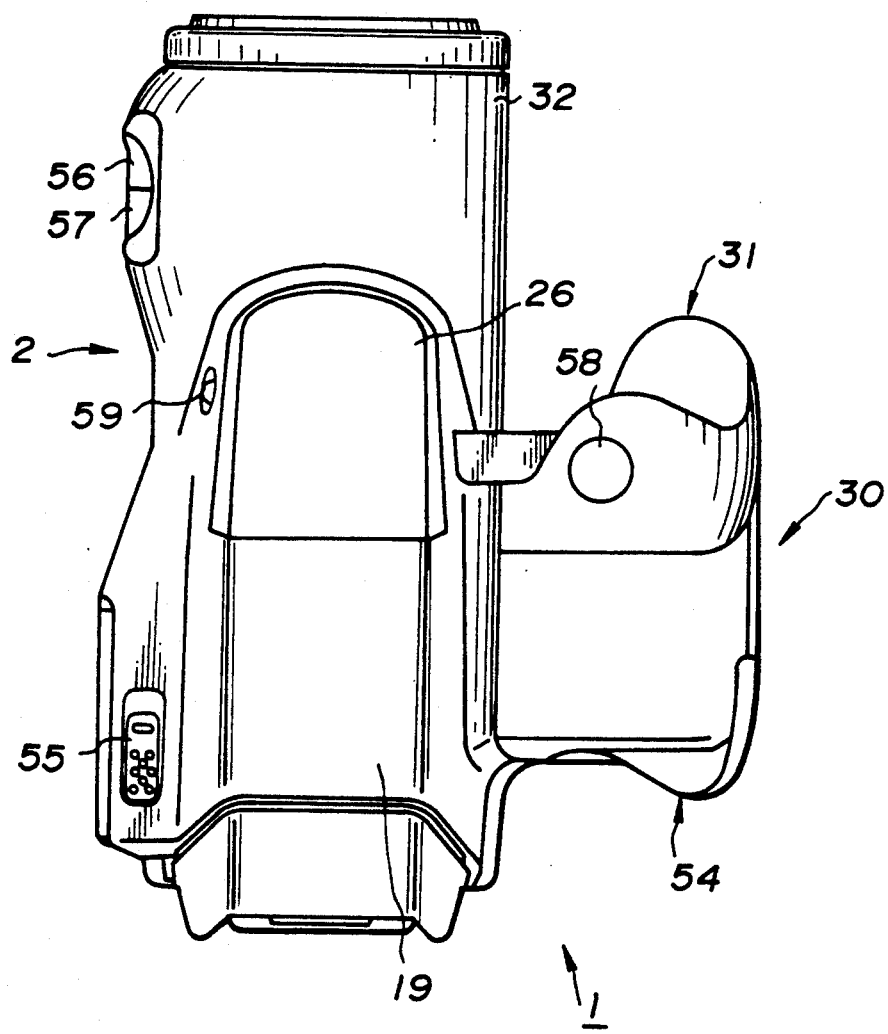
FIG. 1 is a plan view which illustrates a first embodiment of a camera according to the present invention.

FIGS. 1 to 10 illustrate the structure of a first embodiment of a camera according to the present invention and a state where the camera is being used. FIG. 1 is a top plan view which illustrate the first embodiment of the camera. Referring to FIG. 1, a camera 1 has a grip portion 30 disposed on the right side of a lens barrel 2 when viewed from a portion in the vicinity of a finder 19. Furthermore, a portion on the left side of the grip portion 30 takes the form of a flat shape running parallel to the surface of the lens barrel 2.

Figure 2:
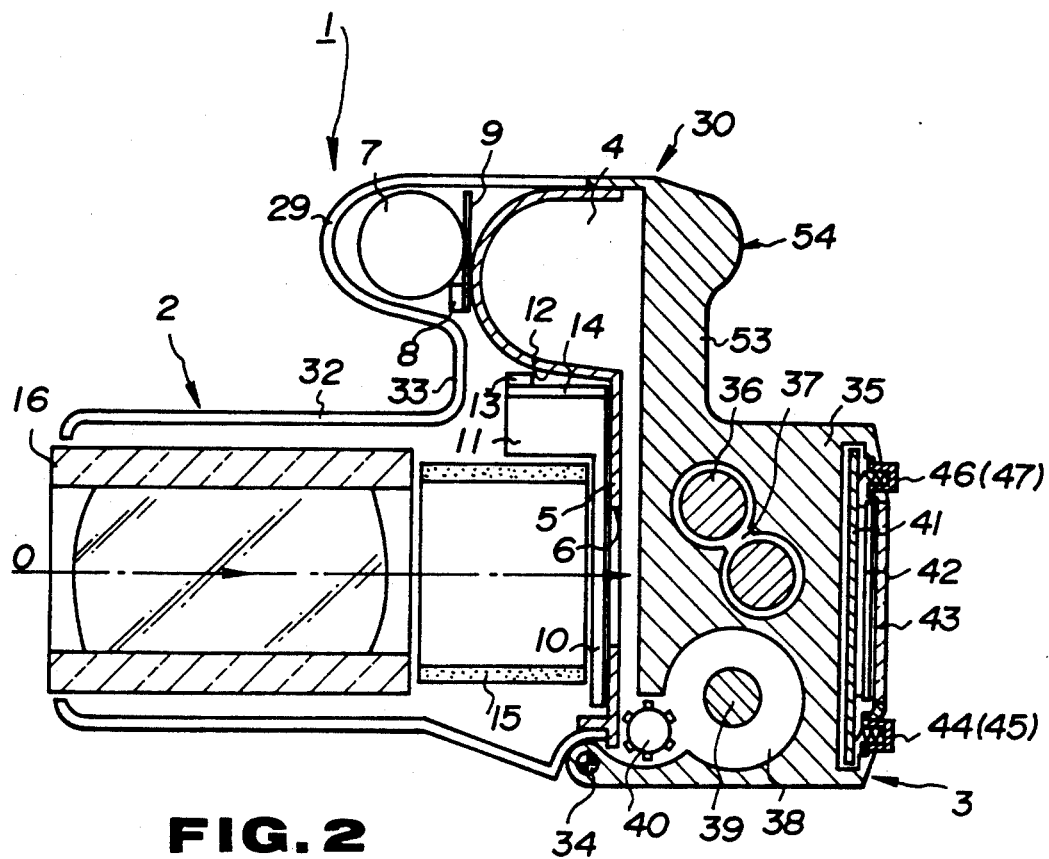
FIG. 2 is a horizontal cross-sectional view which illustrates the camera shown in FIG. 1.

FIG. 2 is a horizontal cross-sectional view of the camera 1 according to this embodiment. Referring to FIG. 2, the camera 1 is sectioned into a camera body 2 and a back cover 3. A rear plate 5 forming a film magazine accommodating chamber 4 is disposed at the rear of the camera body 2, the rear plate 5 having an aperture 6 for defining the image to be photographed.

A capacitor 7 of a flashlight to be described later is disposed on the front surface of the above-described film magazine accommodating chamber 4. Between the above-described capacitor 7 and the magazine accommodating chamber 4, a printed circuit board 9 for supporting an electric part 8 such as an (integrated circuit) IC is disposed.

A known shutter mechanism 10 is disposed in front of the above-described rear plate 5. Between a drive mechanism 11 of the above-described shutter mechanism 10 and a wall 12 of the film magazine accommodating chamber 4, a printed circuit board 14 for supporting an electric part 13 such as an IC is disposed.

A mirror box 15 to be described later is disposed to cover the overall surface of the above-described shutter mechanism 10. Furthermore, a lens barrel 16 is formed in front of the mirror box 15, the lens barrel 16 having optical axis O which is made to coincide with the center line of the above-described aperture 6.

Figure 3:
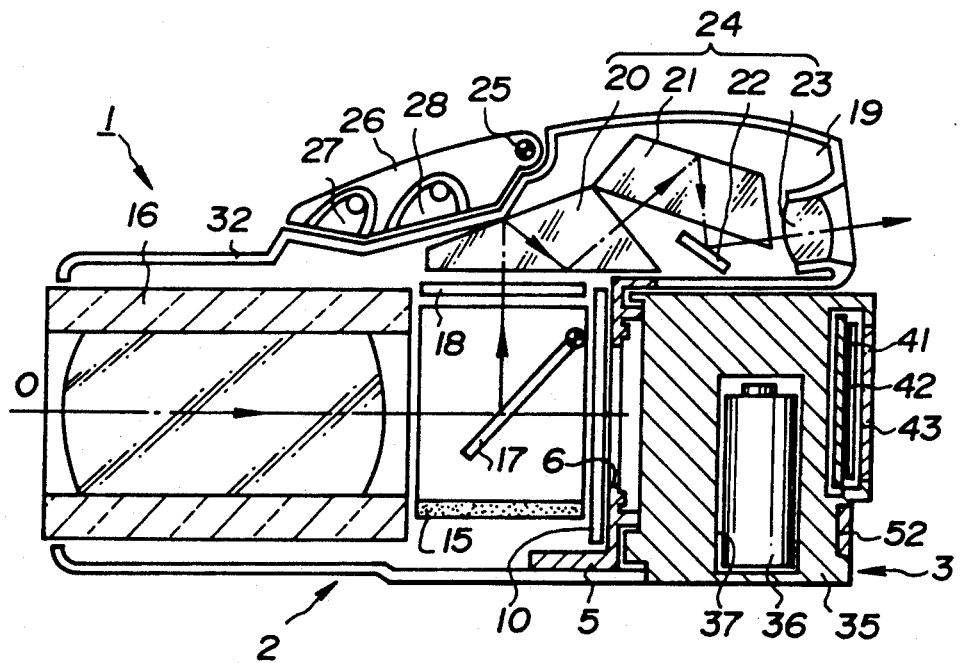
FIG. 3 is a vertical cross-sectional view which illustrates the camera shown in FIG. 1.

The mirror box 15 accommodates a main mirror 17 as shown in FIG. 3 which is a vertical cross sectional view of the camera. Furthermore, a finder screen 18 is disposed above the mirror box 15 in such a manner that the finder screen 18 substantially parallels the main body 2. The position of the above-described finder screen 18 is adjusted to be optically conjugated with the film surface.

As shown in FIG. 1, an expanded portion 19 expanding above the back cover 3 is formed above the mirror box 15 of the camera body 2.

The expanded portion 19 accommodates a prism 20 and a roof mirror 21 which is disposed at the rear of the prism 20. A plane mirror 22 is disposed at the rear of a portion below the roof mirror 21, and an ocular lens 23 is disposed at the rear of the plane mirror 22. The above-described elements constitute a finder optical system 24.

The prism 20 has an optical plane of incidence made to confront the above-described finder screen 18, while its light emitting plane is made to confront the roof mirror 21.

The light emitting plane of the roof mirror 21 is made to confront the plane mirror 22, while the plane mirror 22 is made to confront the ocular lens 23.

A photographed beam passes through the lens barrel 16 before it is upward reflected by the main mirror 17, so that it is imaged on the finder screen 18.

The image thus formed is converted into an erect image by the roof mirror 21 and the plane mirror 22 before it is emitted rearward from the camera, so that it can be observed by a photographer.

The above-described main mirror 17 is positioned as shown in FIG. 3 when the photographer observes the scope of the finder. As a result, the main mirror 17 introduces the photographed beam into the finder optical system 24 as described above. The main mirror 17 is snapped up to a position at which it substantially coincides with the position of the finder screen 18 by a drive mechanism (omitted from illustration) at the time of photographing a subject so that the above-described photographed beam is introduced to the film surface via the above-described aperture 6.

Figure 4:
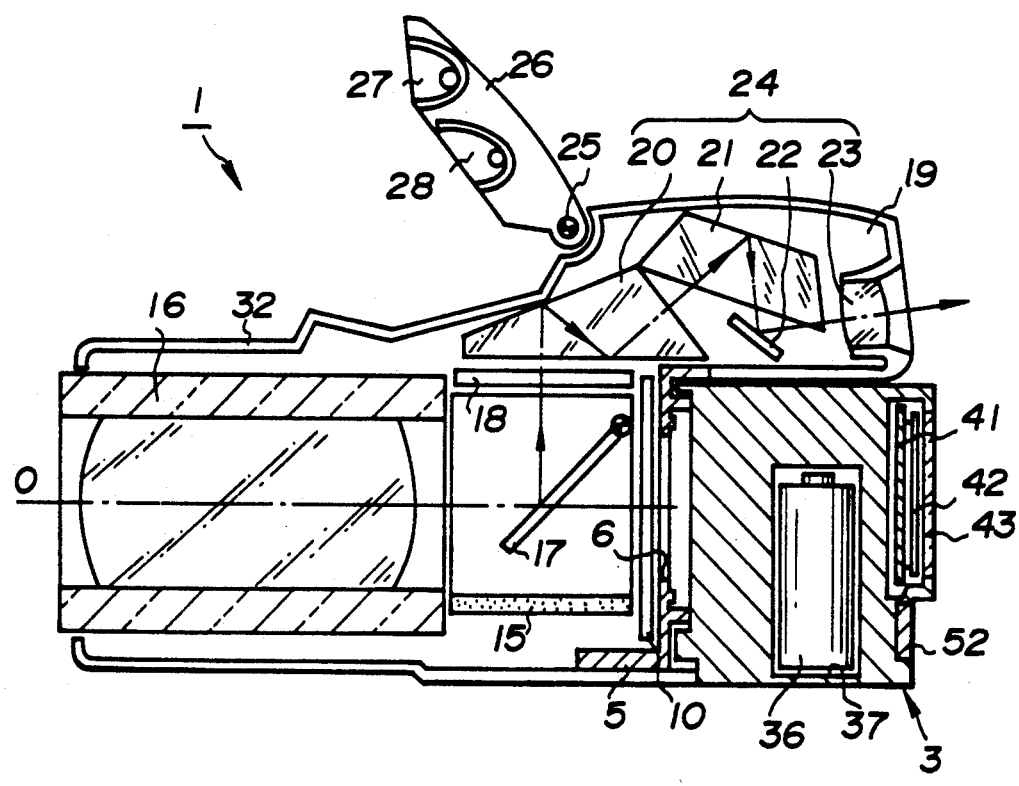
FIG. 4 is a vertical cross-sectional view which illustrates the state where the operation of a flashlight of the camera shown in FIG. 1 is commenced.

A shaft 25 is disposed adjacent to the outer wall of the camera body 2 which is formed in front of the above-described prism 20, the shaft 25 pivotally supporting the flashlight 26 in such a manner that the flashlight 26 can be brought to a closed position at which its outer shape substantially coincides with that of the camera body 2 and to an opened position at which it substantially stands erect over the camera body 2 as shown in FIG. 4 which is a vertical cross-sectional view.

When the flashlight 26 is positioned at the opened position as shown in FIG. 4, first light emitting means 27 is disposed in the upper portion on the surface which faces the forward direction of the camera 1, while a second light emitting means 28 is disposed in the lower portion. The above-described first and second light emitting means 27 and 28 are respectively supplied with power from the above-described capacitor 7. Furthermore, their light emitting operations are respectively controlled by a control circuit (omitted from illustration).

Figure 5:
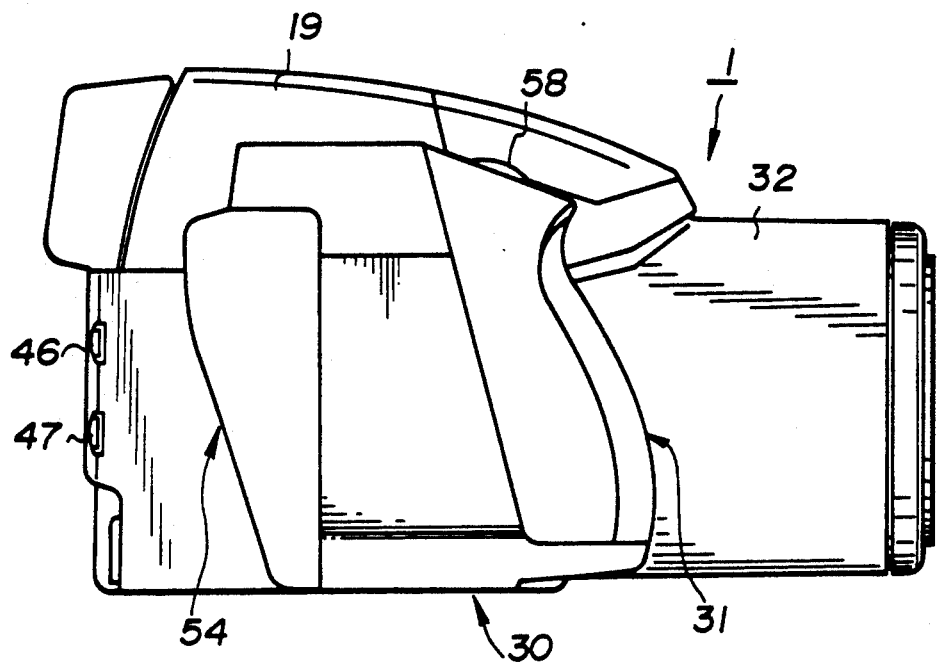
FIG. 5 is a side elevational view which illustrates the camera shown in FIG. 1.

On the other hand, the outer surface of the front and side portions of the above-described capacitor 7 are, as shown in FIG. 2, covered with an outer wall 29 of the camera body 2, the outer wall 29 constituting the front portion 31 of the grip portion 30 held by the fingers of the photographer. As shown in FIG. 5 which is a side elevational view, the front portion 31 constitutes a slant formed toward the rear portion of the camera 1 from the lower end portion of the front portion 31 to the upper end portion of the same.

The above-described drive mechanism 11 of the above-described shutter mechanism 10 and the printed circuit board 14 are disposed in a space defined by the wall 12 of the film magazine accommodating chamber 4 and the mirror box 15. The above-described space is used to straighten the curl of the film delivered from the film magazine before the film reaches the aperture 6. The front portion of the drive mechanism 11 of the shutter mechanism 10 and that of the printed circuit board 14 are covered with a connection wall 33 which establishes a connection between the front portion 31 of the above-described grip portion 30 and an outer wall 32 of the lens barrel 16, the connection wall 33 having a shape retracted from the above-described front portion 31.

The connection wall 33 is formed in such a manner that the leading portions of the fingers except for the thumb of the photographer can be placed along the connection wall 33.

The back cover 3 is pivotally supported by a shaft 34, which is disposed in the camera body 2 as shown in FIG. 2, in such a manner that the back cover 3 can be opened/closed with respect to the camera body 2.

A projecting portion 35 rearward projecting over the surface of the camera 1 is formed at the rear of the above-described aperture 6 formed in the back cover 3.

The projecting portion 35 includes a battery accommodating chamber 37 for accommodating a power supply battery 36 and a film winding chamber 38 for winding the film on which the image of a subject has been photographed. The projecting portion 35 further includes a film winding spool 39 and a sprocket 40 disposed in the film winding chamber 38 and rotated by a power source such as a motor.

A printed circuit board 41, which is connected to the above-described printed circuit boards 9 and 14 by an electric wiring such as a flexible printed circuit board (omitted from illustration), is disposed at the rearward terminating end portion of the above-described projecting portion 35.

A liquid crystal display plate (hereinafter simply called as "LCD") is electrically connected to the rear surface of the above-described printed circuit board 41, the LCD 42 displaying a variety of photographing information items such as the number of frames of the film on which the image of a subject has been photographed, the shutter speed, the diaphragm, the quantity of the exposure correction and the like.

The LCD 42 displays the above-described various photographing information items in a direction toward the rear portion of the camera 1 via a transparent protection panel 43 secured to the rear end surface of the projecting portion 35.

Figure 6:
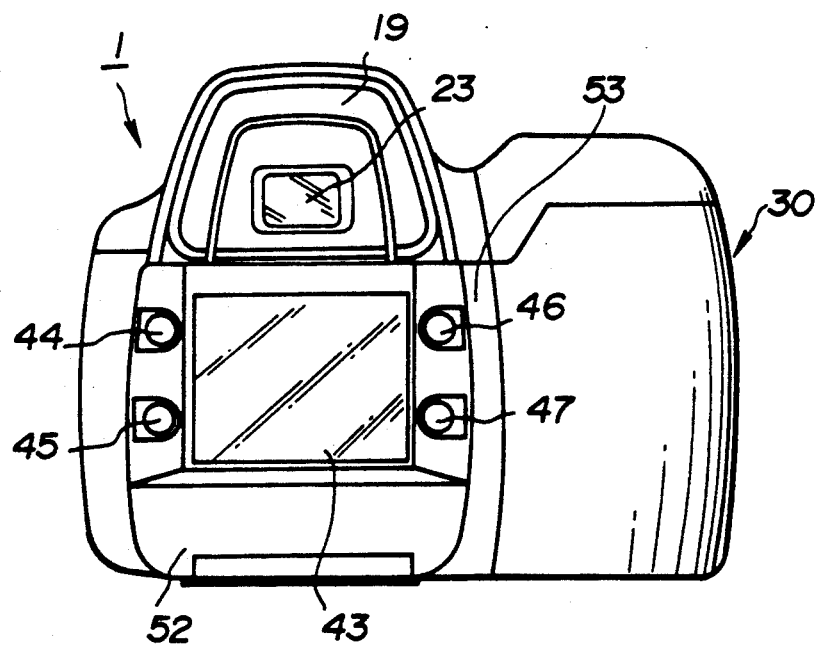
FIG. 6 is a back view which illustrates the camera shown in FIG. 1.

The above-described printed circuit board 41 is arranged to be larger in width than the width of the above-described LCD 42 and that of the protection panel 43 in order to create an area in which a switch is disposed, the switch being switched on/off by operation buttons 44 to 47 disposed on the side surfaces of the LCD 42 and the protection panel 43 as shown in FIG. 6 which is a rear view.

The above-described switches are used to set/select photographing operations such as the exposure mode change, setting of the exposure correction and the like which are usually frequently selected. When any one of the buttons 44 to 47 is selected and operated by the photographer, the photographing operation of the camera 1 can be changed/controlled as is selected.

An opening/closing plate 52, which can be opened/closed with respect to the projecting portion 35, is disposed below the LCD 42. When the opening/closing plate 52 is opened, switch members appear and are accessible from outside the camera, the switch members being used to set/select a photographing operation, which is not frequently selected, such as the rewinding operation of the film prior to the completion of photographing images on all of the frames of the film and the change of data to be superimposed on the film.

A thin portion 53 is formed in the back cover 3 at the rear of the above-described film magazine accommodating chamber 4, the thin portion 53 having its rear end surface extending forward of the right side of the projecting portion 35.

The dimension of the thin portion 53 is selected in such a manner that the thumb of the photographer does not project rearwardly over the projecting portion 35 if the same is placed in the thin portion 53.

The side portion of the thin portion 53 is continued to the above-described grip portion 30 to form a rear portion 54 of the grip portion 30.

The rear surface of the rear portion 54 expands rearwardly over the camera 1 from its lower end portion to the upper end portion as shown in FIG. 5 which is the side elevational view, so that a slanted surface is formed.

The lower end portion of the rear portion 54 is placed in the same plane in which the thin portion 53 is placed. On the other hand, the upper end portion of the rear portion 54 projects rearwardly over the above-described plane. As a result, the thumb of the fingers of the photographer is able to be placed when the grip portion 30 is held by the photographer.

Then, the exterior view of the camera 1 according to this embodiment will now be described with reference to FIG. 1 which is a plan view.

When viewed from the portion adjacent to the finder 19, a power supply switch 55 is disposed at the rear of the left side of the top surface of the camera body 2. When the power supply switch 55 is slid in the forward direction of the camera 1, power is supplied to the camera 1.

A pair of zoom operation buttons 56 and 57 are disposed on the left-hand surface of the outer wall 32 which covers the lens barrel 16. The lens barrel 16 is zoomed to the long focal distance side when the operation button 56 is depressed, while the same is zoomed to the short focal distance side when the operation button 57 is depressed.

A release button 58 is disposed on the top surface in the front portion of the grip portion 30. When the release button 58 is depressed, the photographing operation is commenced.

An operation knob 59 is disposed on the right side surface confronting the flashlight 26, the operation knob 59 causing the flashlight 26 to be moved to an opened state as shown in FIG. 4 when it is operated.

Then, the operation of the camera 1 thus constituted will now be described.

First, the camera power supply switch 55 is switched on, and a back cover fastening mechanism (omitted from illustration) is released so as to load a film into the camera 1 prior to the commencement of the photographing operation. Then, the back cover 3 is brought to the opened state with respect to the camera body 2 as shown in FIG. 7 which is a horizontal cross-sectional view.

Then, the film magazine 60 is inserted into the film magazine accommodating chamber 4 before the leading portion of a film 61, which has been extended from the aperture formed in the film magazine 60, is placed adjacently to the shaft 34.

Figure 7:
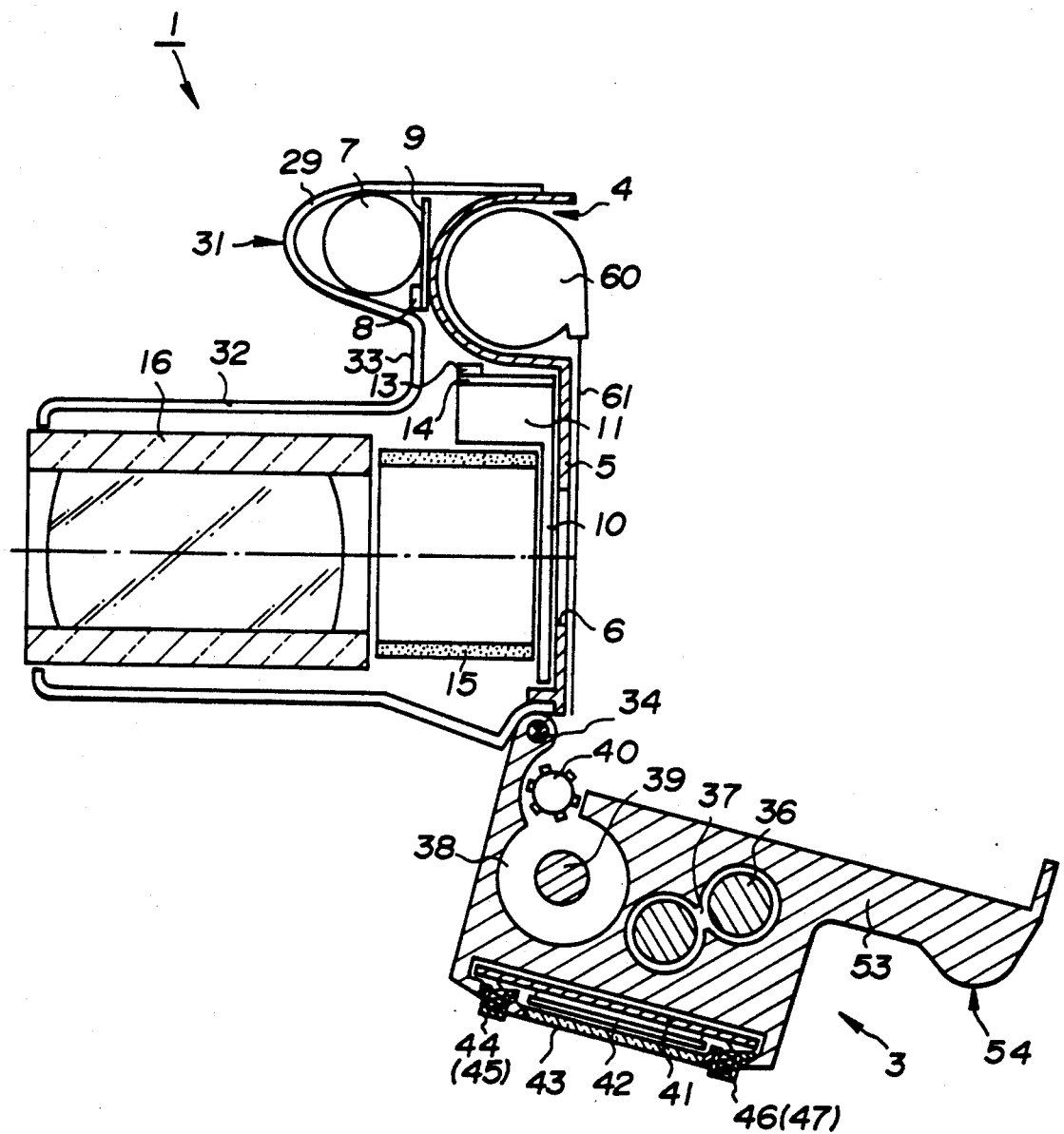
FIG. 7 is a horizontal cross-sectional view which illustrates a state where a back cover of the camera shown in FIG. 1 is opened.

When the back cover 3 is, with respect to the camera body 2, closed, this closing operation is detected by back-cover-closing operation detection means (omitted from illustration), causing the sprocket 40 to commence its counterclockwise rotation as shown in FIG. 7.

The rotation thus commenced causes the sprocket 40 and the perforation formed on the film 61 to engage with each other. As a result, the leading portion of the film 61 is introduced into a portion of the chamber in front of the film winding spool 39 disposed in the film winding chamber 38.

After a predetermined time has passed from the commencement of the rotation of the sprocket 40, the film winding spool 39 commences clockwise rotation. As a result, the leading portion of the film 61 is wound about the film winding spool 39.

Simultaneously, the sprocket 40 is separated from the power source and the sprocket thereby rotates following the winding of the film 61, the sprocket serving as a member for detecting the quantity of the film wound by its rotation.

Although the film is loaded after the power supply switch has been switched on according to this embodiment, another structure may, of course, be employed which is arranged in such a manner that a program to be operated by a CPU disposed in a camera is adjusted so as to be capable of commencing the film loading operation by the back-cover closing operation while eliminating the necessity of switching on the power supply switch.

At the time of the photographing operation, the grip portion 30 of the camera 1 is held by the fingers of the right hand of the photographer while placing the forefinger on the release button 58. Simultaneously, the fingers of the left hand are placed along the outer wall 32 of the lens barrel 16 in such a manner that the thumb of the left hand lightly rest against the portion of the camera housing in the vicinity of the zoom operation buttons 57 and 57.

When photographing is performed, the release button 58 is depressed so that the photographing sequence is started. Furthermore, when the focal distance of the lens barrel 16 is changed, the zoom operation buttons are sequentially operated.

As a result of the structure of the camera thus-arranged, the upper arm of the photographer can be placed along the body. Furthermore, when the photographer observes the ocular lens 23 as shown in FIG. 10, the thumb of the right hand or the like does not project rearwardly over the projecting portion 35. Therefore, the thumb of the right hand or the like does not touch the face of the photographer. As a result, the photographing operation can be performed comfortably.

The left hand of the photographer is placed along the outer wall 32 of the lens barrel 16. In this case, the camera 1 can be easily supported because the bottom surface of the outer wall of the camera 1 does not come in contact with the wrist of the left hand.

In addition, since the outer wall opposing the grip portion 30 is a flat surface, this flat portion faces downward when the camera is vertically supported while making the grip portion 30 face upward. Therefore, the camera can be stably supported by the palm of the left hand.

Furthermore, the winding device, which has been, according to the conventional camera, disposed in the portion opposing the grip portion 30, is disposed at the rear of the aperture 6, that is, at the rear of the lens barrel 16. As a result, the rotational moment, which undesirably acts on the grip portion 30, can be reduced, causing an excellent weight balance to be realized.

Furthermore, the camera 1 according to this embodiment is arranged in such a manner that the ocular lens 23 of the finder optical system 24 is disposed above the projecting portion 35. Therefore, there is no obstruction in front of the right-hand eye when the photographer observes the ocular lens 23 with the right-hand eye thereof. As a result, the overall region to be photographed can be observed by the left-hand eye.

Then, a second embodiment of the present invention will now be described with reference to FIG. 11 which is a horizontal cross-sectional view.

According to this embodiment, the same elements as those according to the above-described first embodiment are given the same reference numerals and their descriptions are omitted here.

Figure 11:
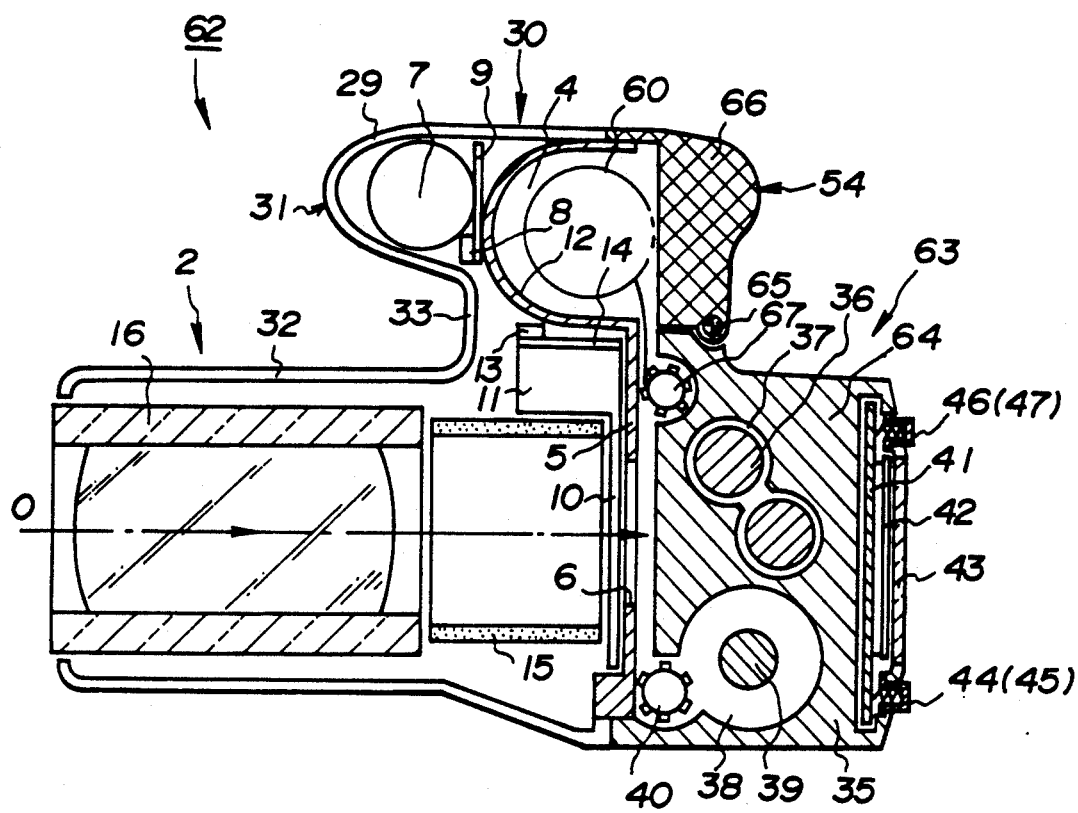
FIG. 11 is a horizontal cross sectional view which illustrates a second embodiment of the camera according to the present invention.

As shown in FIG. 11, a camera 62 is sectioned into the camera body 2 and a back cover 63 disposed at the rear of the camera body 2.

The back cover 63 is, at a portion confronting the wall 12 of the film magazine accommodating chamber 6, sectioned into a stationary portion 64 formed integrally with the camera body 2 and a magazine cover 66 pivotally supported by a shaft 65 disposed in the stationary portion 64 in such a manner that the magazine cover 66 can easily be opened/closed. The above-described stationary portion 64 is a projecting portion formed at the rear of the opening 6 so as to place the film winding device or the like. The projecting portion 35 of the camera 1 according to the above-described first embodiment corresponds to the above-described portion.

The magazine cover 66 is fastened to the camera body 2 by a fastening mechanism (omitted from illustration) provided for the camera body 2.

In a portion in the vicinity of the boundary between the stationary portion 64 and the magazine cover 66, an initial winding sprocket 67 is disposed which is arranged to be brought to a state where it is rotated while being connected to a winding mechanism (omitted from illustration) and a state where it is rotated by the conveyance motion of the film after the above-described connection has been released.

Then, the operation of the camera 62 according to this embodiment will now be described.

First, the power supply switch of the camera 62 is switched on, and the back cover fastening mechanism (omitted from illustration) is released for the purpose of loading a film into the camera 62 prior to the commencement of the photographing operation. Furthermore, the magazine cover 66 is opened with respect to the camera body 2.

Then, a film magazine 60 is inserted into the film magazine accommodating chamber 4 before the leading portion of the film 61, which has been extended through the aperture formed in the film magazine 60, is inserted to a portion between the camera body 2 and the stationary portion 64.

When the opening/closing member 66 is, in the above-described state, closed with respect to the camera body 2, it is detected by the back-cover closing operation detection means (omitted from illustration) so that the initial winding sprocket 67 commences the counterclockwise rotation as shown in FIG. 11.

The above-described rotation causes the initial winding sprocket 67 and the perforation formed in the film 61 to engage with each other, causing the leading portion of the film 61 to be conveyed to a position exceeding the sprocket 40.

The sprocket 40 commences the counterclockwise rotation as shown in FIG. 11, causing the sprocket 40 and the perforation formed in the film 61 to engage with each other, causing the leading portion of the film 61 to be introduced into a portion of the chamber 38 in front of the film winding spool 39.

Simultaneously, the initial winding sprocket 67 is separated from the power source, and the initial winding sprocket 67 thereafter rotates following the conveyance of the film 61.

When the film winding spool 39 commences the clockwise rotation after a predetermined time has passed from the commencement of the rotation of the sprocket 40, the leading portion of the film 61 is wound about the film winding spool 39.

Simultaneously, the sprocket 40 is separated from the power source and the sprocket thereby rotates following the winding of the film 61 (FIG. 7), the sprocket serving as a member for detecting the quantity of the film wound by its rotation.

Although the film is loaded after the power supply switch has been switched on according to this embodiment, another structure may, of course be, employed which is arranged in such a manner that a program to be operated by a CPU disposed in a camera 62 is adjusted so as to be capable of commencing the film loading operation by the back-cover closing operation while eliminating the necessity of switching on the power supply switch.

Figure 8:
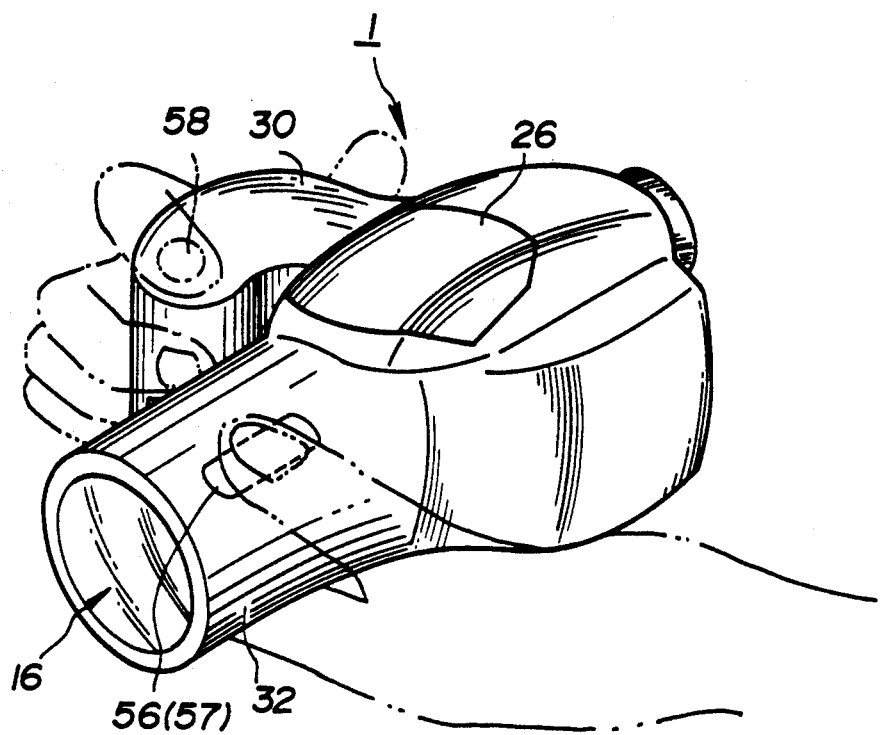
FIG. 8 is a perspective view which illustrates a state where the camera shown in FIG. 1 is held.
Figure 9:
FIG. 9 is a side view which illustrates the state where the camera shown in FIG. 1 is held.

At the time of the photographing operation, the camera 62 is held as shown in FIG. 8 which is a perspective view similar to the above-described first embodiment before the commencement of photographing.

As a result of the structure thus-arranged, an effect similar to that obtainable from the camera 1 according to the above-described first embodiment can be obtained from the camera 62 according to this embodiment. Furthermore, since the weight of the magazine cover 66, which is opened with respect to the camera body at the time of loading the film, can be reduced, a problem, which is taken place in that the magazine cover 66 is undesirably closed even if the camera 62 is inclined in such a manner that the grip portion 30 faces downward while opening the magazine cover 66, can be overcome.

Although the grip portion 30 is, according to the above-described first and second embodiments, arranged in such a manner that it extends in the direction of the height of each of the cameras 1 and 62, another structure may, of course, be employed in which the same is extended in parallel to the optical axis at a position in the side portion of the lens barrel 16 to be continued from the lens barrel 16.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A camera comprising:
   a camera body;
   an aperture portion formed in said camera body and defining a frame for an image to be photographed on a film arranged adjacent to the aperture portion;
   a lens barrel disposed in front of said aperture portion and extending in the forward direction of said camera body;
   a projecting portion disposed at the rear of an aperture portion for forming said image to be photographed on said film;
   a grip portion disposed on one side surface of said projecting portion, and having a rear end surface at a position which is forward of the rear end surface of said projection portion and is adapted to be held by the fingers of either hand of a photographer;
   said grip portion including a swelling portion swelled in the rearward direction of said rear end surface outside of said grip portion and a rear end portion of said swelling portion being arranged in the forward direction of said projecting portion respectively forming a curved convex surface for receiving a portion of the palm of the hand and a curved concave portion to provide a curved concave gripping portion for the thumb to enhance stable gripping of the camera;
   a flat portion formed in the other side surface of said projection portion opposite said grip portion in such a manner that said flat portion gradually merges with a surface of said lens barrel to form a substantially continuous, smooth surface;
   a film winding device being disposed in said projecting portion; and
   a film magazine accommodating chamber being disposed within and toward the rear of said grip portion.

2. A camera according to claim 1, wherein a mirror box is disposed in an optical path extending between said lens barrel and said aperture portion.

3. A camera according to claim 1, wherein a shutter is disposed between said aperture portion and said lens barrel.

4. A camera according to claim 1, wherein a main capacitor of said flashlight device is disposed in a front portion of said grip portion;
   a printed circuit board having at least one electric part being disposed between said main capacitor and a film magazine accommodating chamber provided in said grip portion;
   said printed circuit board having at least a portion of a control circuit for controlling said flashlight device.

5. A camera according to claim 1, wherein a battery accommodating chamber is provided in said projecting portion.

6. A camera according to claim 5 further comprising hinge means for pivotally mounting said projecting portion enabling said projecting means to move between an open and a closed position;

means responsive to movement of said projecting portion to said closed position for operating said sprocket.

7. A camera according to claim 1 further comprising;

operation means disposed near a front of said lens barrel and on a side surface adjacent to said flat portion, said operation means acting to change the focal distance of a photographing lens disposed in said lens barrel.

8. The camera according to claim 7 further comprising:

a grip portion disposed on either side surface of the projecting portion and having a rear end surface at a position which is forward of the rear end surface of the projecting portion and is adapted to be held by the fingers of either hand of a photographer.

9. A camera according to claim 1, wherein a finder optical system is disposed in an upper portion of sad projecting portion.

10. A camera according to claim 9, wherein a flashlight device is disposed in a triangular-shaped space provided in front of said finder optical system and above said lens barrel.

11. A camera according to claim 10 wherein a lens barrel cover encloses said lens barrel, the flashlight device including a flashlight device cover slipping diagonally downwardly and toward said lens barrel cover so that said flashlight device cover merges smoothly with said lens barrel cover.

12. A camera according to claim 10 wherein a lens barrel cover encloses said lens barrel, said substantially triangularly-shaped region being located directly above a rearward portion of the lens barrel cover.

13. A camera which is adapted to perform a photographing operation after a film has been loaded into a camera body thereof comprising:

an aperture portion formed in said camera body and defining the frame of an image to be photographed on said film;

a film magazine accommodating chamber disposed adjacent to a side of said aperture portion and accommodating a film magazine;

a lens barrel disposed in front of said aperture portion:

a grip portion formed to cover said film magazine accommodating chamber; and a projecting portion extending rearwardly from said aperture portion and including a film winding deice for winding said film which has passed at a rear end of said aperture portion and is exposed to light;

said film winding device being disposed in a movable back cover forming a part of said projecting portion so that said film winding device comes in contact with a film loaded therein due to a closing operation of said back cover.

14. A camera according to claim 13, wherein a main capacitor of a flashlight is disposed in front of said film magazine accommodating chamber and in said grip portion; and a printed circuit having at least one electric part being disposed between said film magazine accommodating chamber and a main capacitor accommodating chamber also provided in said grip portion.

15. A camera comprising:

a camera body;

an aperture portion disposed in the camera body and defining an image to be photographed on a film;

a lens barrel disposed in front of said aperture portion and extending in the forward direction of said camera body;

a projecting portion having a hinge portion pivotally coupling said projecting portion to the camera body, said projecting portion disposed at the rear of said aperture portion, having a film winding mechanism which includes a film spool chamber, forming a rear end surface of said camera and exposing said aperture portion by rotating said projecting portion around said hinge portion disposed on either side of said camera, when a film cartridge is loaded/unloaded;

a grip portion disposed on the other side of said camera opposite said hinge portion, said grip portion being positioned in front of the rear end surface of said projecting portion and adapted to be held by the fingers of a photographer; and a flat portion formed on the other side surface of said projection portion at a position adjacent to said hinge portion and aligned substantially parallel to a direction in which said lens barrel is extended.

16. A camera according to claim 15, wherein said grip portion has a rearwardly directed surface portion which is gradually inclined rearward in an upward direction from a lower end of said camera to define an inclined rearward surface portion to facilitate gripping of the gripping portion by the hand of an operator to enhance the stability of the camera during a hand-held photographing operation.

17. A camera comprising:

a camera body;

an aperture portion formed in a said camera body and defining the frame for an image to be photographed on a film arranged adjacent to the aperture portion;

a lens barrel disposed in front of said aperture portion and extending in the forward direction of said camera body;

a projecting portion disposed at the rear of said aperture portion, and having a rear end surface at a position which is forward of a rear end surface of said projecting portion and is adapted to be held by the fingers of either hand of a photographer; and said grip portion including a swelling portion swelled in the rearward direction of said rear end surface outside of said grip portion and a rear end portion of said swelling portion being arranged in the forward direction of said projecting portion respectively forming a curved convex surface for receiving a portion of the palm of the hand and a curved concave portion to provide a curved convex gripping portion for the thumb to enhance stable gripping of the camera;

a flat portion formed in another side surface of said projection portion opposite said grip portion in such a manner that said flat portion gradually merges with a side surface of said lens barrel to form a substantially flat continuous, smooth surface; and a flashlight device being disposed in a triangular-shaped space provided in front of said finder optical system and above said lens barrel.

18. A camera according to claim 17, wherein photographing information display means is disposed on a rear end surface of said projecting portion;

an operation member being provided for initiating one of the camera functions including changing and controlling the photographing operation, said operation member being disposed on said rear end surface of said projecting portion, said operation member being disposed at a position in a vicinity of said photographing information display means.

19. A camera according to claim 17, wherein photographing information display means is disposed on a rear end surface of said projecting portion;
an operation member being provided for initiating one of the camera functions including changing and controlling the photographing operation, said operation member being disposed on said rear end surface of said projecting portion, said operation member being disposed at a position in a vicinity of said photographing information display means.

20. A camera according to claim 17, wherein a main capacitor of said flashlight device is disposed in a front portion of said grip portion;
a printed circuit board having at least one electric part being disposed between said main capacitor and a film magazine accommodating chamber provided in said grip portion;
said printed circuit board having at least a portion of a control circuit for controlling said flashlight device mounted on said printed circuit.

21. A camera comprising:
a camera body;
an aperture portion formed in a said camera body and defining the frame for an image to be photographed on a film arranged adjacent to the aperture portion;
a lens barrel disposed in front of said aperture portion and extending in the forward direction of said camera body;
a projecting portion disposed at the rear of said aperture portion for forming said image to be photographed on said film;
a grip portion disposed on a side surface of said projecting portion, and having a rear end surface at a position which is forward of a rear end surface of said projecting portion and is adapted to be held by the fingers of either hand of a photographer; and
said grip portion including a swelling portion swelled in the rearward direction of said rear end surface outside of said grip portion and a rear end portion of said swelling portion being arranged in the forward direction of said projecting portion respectively forming a curved convex surface for receiving a portion of the palm of the hand and a curved concave portion to provide a curved convex gripping portion for the thumb to enhance stable gripping of the camera;
a flat portion formed in another side surface of said projection portion opposite said grip portion in such a manner that said flat portion gradually merges with a side surface of said lens barrel to form a substantially flat continuous, smooth surface; and
a battery accommodating chamber being provided in said projecting portion.

22. A camera according to claim 21, wherein photographing information display means is disposed on a rear end surface of said projecting portion;
an operation member being provided for initiating one of the camera functions including changing and controlling the photographing operation, said operation member being disposed on said rear end surface of said projecting portion, said operation member being disposed at a position in a vicinity of said photographing information display means.

23. A camera according to claim 22, further comprising means for selectively displaying one of a numeric value and a function responsive to operation of said operating member.

24. A camera comprising:
a camera body;
an aperture portion formed in said camera body and defining a frame for an image to be photographed on a film;
a substantially cylindrical-shaped lens barrel disposed in front of said aperture portion and extending in a forward direction of said camera body;
a projecting portion disposed at the rear of said aperture portion for defining said image to be photographed on said film;
a flat portion formed in a side surface of said projection portion in such a manner that said flat portion gradually and smoothly merges with the adjacent surface of said lens barrel to form a substantially, continuous smooth surface;
operation means disposed in front of said lens barrel on the side surface adjacent to said flat portion of the same, said operating means acting to change the focal distance of a photographing lens disposed in said lens barrel;
a grip portion extending from another side surface of said projecting portion opposite said continuous, smooth surface;
a film cartridge receiving chamber in said grip portion;
a film wind-up mechanism arranged in said projecting portion including a wind-up chamber for receiving film delivered thereto;
said film wind-up chamber being arranged at an end of said projecting portion opposite said grip portion to wind up film in a region rearwardly of said aperture portion.

25. A camera according to claim 31 wherein a film cartridge contains a film wound therein so that a surface of said wound film facing the lens barrel when the film extends across the portion forms a curved concave surface when wound in the film cartridge;
bending said film so that the film surface facing said lens barrel assumes a curved convex contour as it passes said sprocket.

26. A camera according to claim 31 wherein said film wind-up mechanism further comprises a sprocket engaging a film strip extending across said film support portion of said projecting means for driving the film strip into said film wind-up chamber.

27. A camera according to claim 6 further comprising guide means for guiding a film strip driven by said sprocket into said film wind-up chamber.

28. The camera according to claim 26 wherein a film in said cartridge has a light sensitive surface;
said film being wound in said film cartridge so that said light sensitive surface has a curved concave shape;
said film light sensitive surface assuming a curved convex contour as it is advanced by said sprocket.

29. A camera comprising:
a camera body;
an aperture portion formed in said camera body and defining a frame for an image to be photographed on a film arranged adjacent to the aperture portion;

a lens barrel disposed in front of said aperture portion and extending in the forward direction of said camera body;

a projecting portion disposed at the rear of said aperture portion for forming said image to be photographed on said film;

a group portion disposed on either side surface of said projecting portion, and having a rear end surface at a position which is forward of the rear end surface of said projecting portion and is adapted to be held by the fingers of either hand of a photographer;

a flat portion formed in the other side surface of said projection portion opposite said grip portion in such a manner that said flat portion gradually merges with a surface of said lens barrel to form a substantially continuous, smooth surface;

a film winding device being disposed in said projecting portion and including a film wind-up chamber near said flat portion and means for advancing a film from a film magazine in said film magazine accommodating chamber to said film wind-up chamber; and a film magazine accommodating chamber being disposed within and toward the rear of said grip portion.

30. A camera according to claim 29 wherein the film wind-up chamber has a curved annular shape to facilitate winding of a film strip in said wind-up chamber.

31. A camera according to claim 29 wherein said projecting portion is fixed on said camera body.

32. A camera according to claim 31 further including a movable cover for said film magazine accommodating chamber.

33. A camera according to claim 32 wherein said means for advancing includes first sprocket means adjacent said film magazine and second sprocket means adjacent said film wind-up chamber cooperating to respectively advance a film strip from the film magazine to said second sprocket means and from said second sprocket means to said film wind-up chamber.

34. A camera according to claim 3 further comprising means for operating said first and second sprocket means responsive to closing of the cover of said film magazine accommodating chamber.

* * * * *

UNITED STATES PATENT AND TRADEMARK OFFICE
CERTIFICATE OF CORRECTION

PATENT NO. : 5,227,822  
DATED : July 13, 1993  
INVENTOR(S) : TAKAHASHI ET AL.

Page 1 of 2

It is certified that error appears in the above-indentified patent and that said Letters Patent is hereby corrected as shown below:

On title page, item [30]

Foreign Application Priority Data - change "Mar. 25, 1990" (both occurrences) to -- May 25, 1990 --

Column 10, line 25, change "projection" to --projecting--

Column 11, line 20, change "sad" to --said--

Column 11, line 28, change "slipping" to read --sloping--

Column 11, line 39, change "formed" to --disposed--

Column 11, line 50, change "deice" to --device--

Column 12, line 21, change "formed" to --disposed--

Column 12, line 21, delete "other"

Column 12, line 42, after "ture" insert --portion for forming said image to be photographed on said film;
    --a grip portion disposed on a side surface of said projecting--

Column 12, line 57, change "projection" to --projecting--

Column 13, line 54, change "another" to --the other--

Column 13, line 55, change "projection" to --projecting--

UNITED STATES PATENT AND TRADEMARK OFFICE
CERTIFICATE OF CORRECTION

PATENT NO. : 5,227,822
DATED : July 13, 1993
INVENTOR(S) : TAKAHASHI ET AL.

It is certified that error appears in the above-indentified patent and that said Letters Patent is hereby corrected as shown below:

Column 14, line 41, change "31" to --24--

Column 14, line 49, change "31" to --24--

Column 14, line 54, change "6" to --26--

Column 15, line 7, change "group" to --grip--

Column 15, line 13, change "projection" to --projecting--

Column 16, line 19, change "3" to --33--

Signed and Sealed this

Twenty-sixth Day of July, 1994

Attest:

BRUCE LEHMAN

Attesting Officer

Commissioner of Patents and Trademarks